United States Patent [19]

Nakamura

[11] Patent Number: 4,900,940
[45] Date of Patent: Feb. 13, 1990

[54] OPTICAL SYSTEM FOR MEASURING A SURFACE PROFILE OF AN OBJECT USING A CONVERGED, INCLINED LIGHT BEAM AND MOVABLE CONVERGING LENS

[75] Inventor: Takahiro Nakamura, Sagamihara, Japan

[73] Assignee: Anritsu Corporation, Tokyo, Japan

[21] Appl. No.: 194,461

[22] Filed: May 16, 1988

[30] Foreign Application Priority Data

May 21, 1987 [JP] Japan .................. 62-122453

[51] Int. Cl.$^4$ .................. G01B 11/24; G01V 9/04
[52] U.S. Cl. .................. 250/560; 356/376
[58] Field of Search .................. 250/560, 561, 205; 356/1, 4, 141, 152, 376, 394

[56] References Cited

U.S. PATENT DOCUMENTS

| | | | |
|---|---|---|---|
| 4,473,750 | 9/1984 | Oshida et al. | 356/376 |
| 4,558,949 | 12/1985 | Uehara et al. | 356/152 |
| 4,667,113 | 5/1987 | Nakajima et al. | 250/561 |
| 4,677,302 | 6/1987 | Chiu et al. | 250/561 |
| 4,707,610 | 11/1987 | Lindow et al. | 250/560 |
| 4,732,473 | 3/1988 | Bille et al. | 250/560 |
| 4,748,335 | 5/1988 | Lindow et al. | 356/376 |

FOREIGN PATENT DOCUMENTS 0242151 10/1987 European Pat. Off. .
3337251 4/1985 Fed. Rep. of Germany .

*Primary Examiner*—David C. Nelms
*Assistant Examiner*—William Oen
*Attorney, Agent, or Firm*—Frishauf, Holtz, Goodman & Woodward

[57] ABSTRACT

In a system for measuring a surface profile of an object in relation to a reference surface, a laser beam emitted from a laser 1 is converged by a convergent lens 3 and is incident on the surface of the object at an incident angle. The laser beam reflected from the object surface is also converged by the convergent lens 3 on a reference position of a detector 5 to form a beam spot thereon. When the converged laser beam is incident on a trench of the object, the beam spot formed on the detector 5 is deviated from the reference position and the detector 5 generates a deviation signal in accordance with a deviation of the beam spot. The convergent lens 3 is moved by an actuator 8 in accordance with the position signal so that the beam spot on the detector 5 is moved to a reference position. The movement of the convergent lens 3 is detected by a position detector 5 which generates a position signal. A height signal processor 6 processes the deviation and position signals the generates a height signal denoting a height of the trench.

9 Claims, 5 Drawing Sheets

OPTICAL SYSTEM FOR MEASURING A SURFACE PROFILE OF AN OBJECT USING A CONVERGED, INCLINED LIGHT BEAM AND MOVABLE CONVERGING LENS

BACKGROUND OF THE INVENTION

1. Field of the Invention

The present invention relates to a system for measuring a surface profile of an object and, more particularly, a system for optically detecting a surface condition of an object without contacting the object.

2. Description of the Related Art

The surface roughness tester of the probe type is well known as a system for measuring the minute roughness of the surface of an object. However, this surface roughness tester cannot measure the surface deviation of high density LSIs (or DRAMs and the like) having trenches each 0.5-10 $\mu$m wide and 1.0-20 $\mu$m deep, since the tip end of the probe cannot be inserted into such trenches, and the probe may damage their surfaces. It is therefore supposed that this surface roughness tester cannot be used to measure such minute surface deviation.

Electron micrographs are used to examine the dimension and shape of the trenches of these high density LSIs, but the object to be measured may be broken to get these electron micrographs. This is not suitable for use as the manner of examining the minute roughness of object surfaces.

There has been proposed an optical system for measuring the minute roughness of the surface of the object without taching the object. In this optical system, a bundle of white light rays are radiated on an object to be measured, a bundle of light rays reflected from the object are separated into one component reflected from the reference surface of the object and the other component reflected from the bottom of a trench formed on the surface, and the depth of the trench is obtained from spectral interference signals of the both components. There has been also proposed an another optical system utilizing the Michelson interferometer for measuring a roughness of the surfaces of object without contacting the objects. In this another system, a bundle of while light rays is radiated onto an object to be measured, the reference mirror is scanned with a bundle of reference light rays and an interference of the both bundle of light rays is detected so that the depth of the trench can be obtained from intervals between three peaks of the interference.

According to these systems for optically measuring the minute roughness of surface, it is possible to obtain the mean value of depths of the trenches in a certain area. However, it is not possible to obtain the depth of each of trenches. In addition, they take several seconds for measuring the object.

In order to solve these problems, Mr. Hitoshi Takabayashi, inventor of the Laid Open Japanese Patent Application Sho 58-47209 (publicly opened on Mar. 18, 1983), had proposed an optical system, in which the surface of an object to be measured is traced with a convergent laser beam emerged from a projection lens, the laser beam reflected from the object surface to a photo detector. When the laser beam converged by the projection lens enters into a recess such as the trench in this system, it is reflected from the bottom of the trench at an angle different from the angle at which the laser beam is reflected from a reference surface, these laser beams transmitted through the image forming lens form their spots on the photo detector at different positions thereof and the depth of the trench is obtained from the distance between these laser beam spots.

In the above described system, when a high magnification lens is used to form a minimum spot on the object, it is impossible to obtain on proposed optical arrangement, because a working distance is shortened in accordance with the magnification of the lens. Thus, the beam spot size is limited from the working distance. Accordingly, and this system has a limitation in its measuring accuracy.

SUMMARY OF THE INVENTION

The object of the present invention is to provide a system capable of measuring a minute surface profile of an object to be measured at a high speed and with a high accuracy without contacting the object.

According to the present invention, a system for measuring a surface profile of an object in relation to a reference surface, comprising first light source means for generating first measuring coherent light beam, converging means having an optical axis, for converging the light beam generated from the first light beam generating means, directing it to the surface of the object, and relaying light beam reflected from the surface of the object, first detector means having a detecting surface provided with a reference position, for receiving the first light beam reflected from the surfave of the object and emerged from the converging means to form a beam spot on the detecting surface and generating a position signal according to positions of the beam spots on the detecting surface, means for directing the first light beam generated from the light beam generating means to the converging means and the reflected light beam emerged from the converging means to the detecting means, and separating the first light beam generated from the light beam generating means from the optical axis to make it incident upon the converging means so that the first light beam emerged from the converging means is incident on the object at an incident angle, first moving means for supporting the converging means and moving it along the optical axis, second detector means for detecting a movement distance of the converging means moved by the first moving means to generate first distance signal according to the movement distance the converging means, second moving means for moving the object relative to the converging means in a direction substantially perpendicular to the optical axis, energizing means for generating actuating signal responsive to the position signal supplied from the first detector means and energizing the first moving means to move the converging means so as to move the beam spot to the reference position on the detecting surface of the detector means, and signal processing means for processing the position and first distance signals supplied from the first and second detector means to compute the surface profile of the object in relation to the reference surface thereof.

DETAILED DESCRIPTION OF THE PREFERRED EMBODIMENTS

Figures 1, 2:
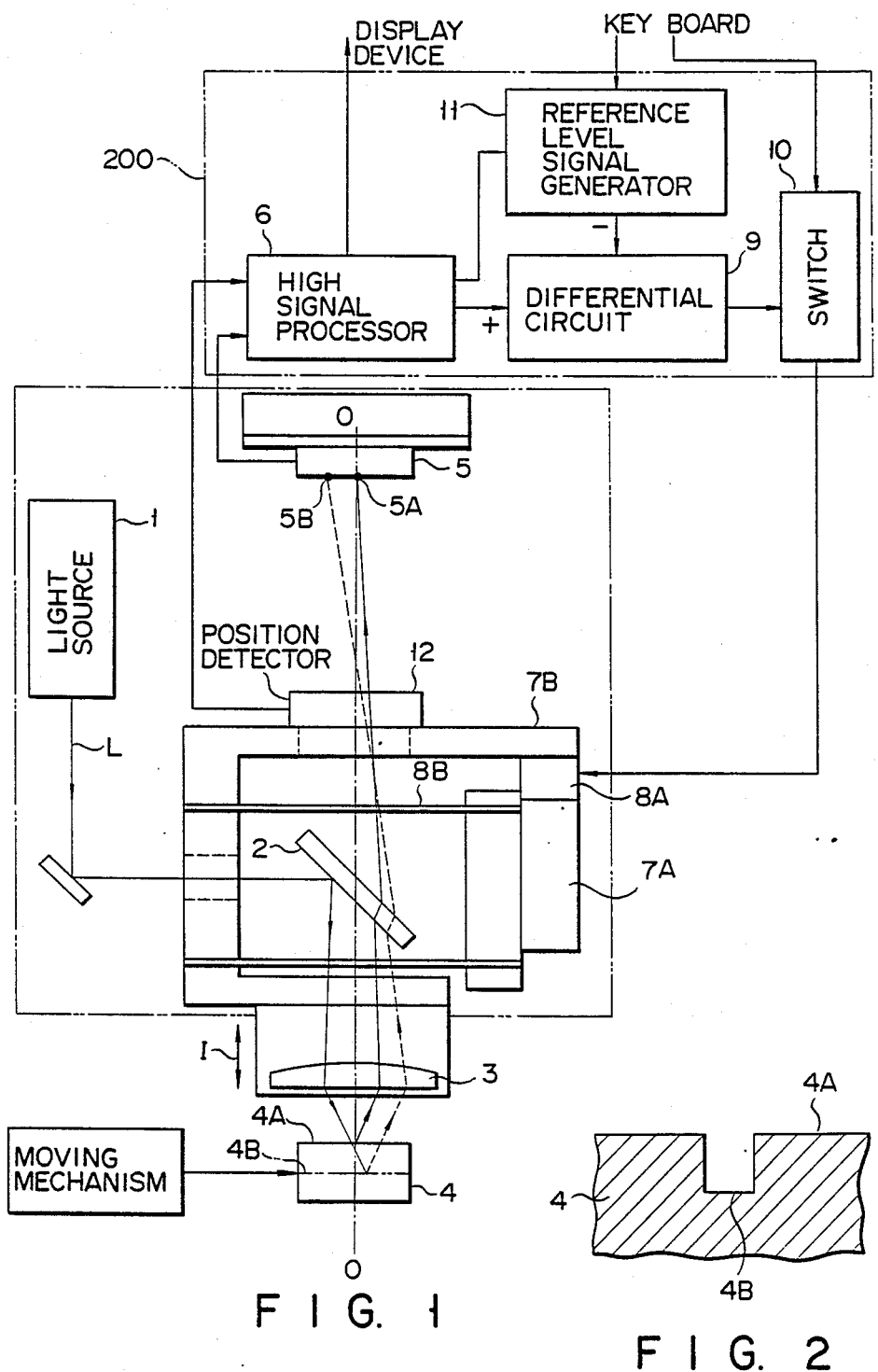
FIG. 1 is a block diagram showing an embodiment of a system for measuring a surface profile of an object to be measured according to the present invention.
FIG. 2 is a sectional view showing the object having a trench structure.

An embodiment of a system for measuring a surface profile of an object to be measured according to the present invention will be described with reference to FIG. 1. Laser beam L generated from a light source 1 such as He-Ne laser or the like is reflected from a reflecting mirror and guided to beam splitter 2 fixed on a base (not shown). The laser beam reflected from beam splitter 2 is transferred to convergent lens 3 where it is converged to enter into object 3 to be measured, that is, reference surface 4A of a semiconductor substrate, for example, at an incident angle $\theta$.

Convergent lens 3 has a relatively large NA of 0.5-1.0, for example, and it is held by mount frame 7B movable on the base. Mount frame 7B is connected to frame 7A, which is fixed to the base, through actuator 8A, for example or piezo-element, for example. One end of parallel spring 8B is fixed to fixed frame 7A while the other end thereof is fixed to that section of movable mount frame 7B which extends parallel to the optical axis. When actuator 8A contracts, parallel spring 8B flexes to cause mount frame 7B to move along optical axis 0—0. Therefore, convergent lens 3 is moved along optical axis 0—0, as shown by arrow I. Parallel spring 8B can move mount frame 7B or convergent lens 3 along the optical axis in a minute range, preventing the optical axis of convergent lens 3 from being slanted or slightly shifted in the lateral direction. In addition, the piezo-element is used as actuator 8B and convergent lens 3 can be thus minutely moved along the optical axis with a high accuracy of 1/100 $\mu$m. The moving mechanism of combining springs which are different in spring multiplier or using the principle of lever may be used when the piezo-element is not used as well as when the piezo-element is used.

The laser beam emerging from convergent lens 3 and entering into reference surface 4A of object 4 at the incident angle $\theta$ forms a beam spot on reference surface 4A while it is reflected from reference surface 4A and returned to convergent lens 3, again. The laser beam returned to convergent lens 3 is introduced to sensor 5 such as the position sensor and CCD line sensor fixed on the base, passing through beam splitter 2. Convergent lens 3 is positioned relative to reference surface 4A in such a way that a beam waist of the laser beam converged by convergent lens 3 can be formed on reference surface 4A or that the laser beam can be focused on reference surface 4A by convergent lens 3, and reference surface 4A and sensor 5 are positioned relative to convergent lens 3 in such a way that images can be focused on both of them through convergent lens 3. As long as the laser beam is focused on reference surface 4A by convergent lens 3, therefore, the image of that beam spot which corresponds to the beam waist formed on reference surface 4A by the converged laser beam is formed on the surface of sensor 5. In order to measure a minute concave and convex pattern on reference surface 4A, it is needed that the beam spot formed on reference surface 4A by the converged laser beam is converged smaller than the concave and convex pattern. When the waveform of the laser beam is 0.6 $\mu$m, the beam waist of the converged laser beam can be set to have a diameter substantially equal to or smaller than 1 $\mu$m. The minimum beam waist is determined by the diffraction limit of lens and it is proportional to the wavelength of laser beam. When a more minute recess and projection pattern is to be measured, therefore, it is preferable that a light source for generating laser beam of shorter wavelength is used to form a more minute beam waist.

When object 4 such as the semiconductor device is moved by a moving mechanism 50 on a plane perpendicular to optical axis 0—0 in above-described optical system 100, the beam waist is usually formed on reference surface 4A. Namely, when the focused laser beam traces reference surface 4A, the image of the beam waist is formed on reference position 5A of the sensor on optical axis 0—0. When the reference surface is traced by the focused laser beam in this manner, reference comparison signal is generated from sensor 5 and supplied to height signal processor 6 of control circuit 200, which includes a memory and a arithmetic circuit. Results computed by height processor 6 are supplied, as reference level signal, to a display device (not shown), reference level signal generator 11 and differential circuit 9. When it is confirmed by the display device that reference surface 4A is traced by the focused laser beam, the reference level signal is held by reference level signal generator 11 responsive to signal applied a key board (not shown). Therefore, the reference level signal is supplied from reference level signal generator 11 and target signal of zero level is supplied from differential circuit 9, where the reference level signal is subtracted from detection signal applied from height signal processor 6, to switch 10. Even if switch 10 which is turned on and off responsive to signal applied from the key board is closed, actuator 8A is held deenergized because the level of this target signal is zero, and as long as the laser beam traces reference surface 4A, convergent lens 3 is not moved.

When the converged laser beam enters into a recess of a certain depth $\Delta h$ or bottom 4B of a trench as shown in FIG. 2, for example, a beam spot larger than the beam waist of the converged laser beam is formed on bottom 4B. Laser beam reflected from bottom 4B is introduced to sensor 5, passing through a passage different from that of the laser beam reflected from reference surface 4A, as shown by a broken line in FIG. 1, and the image of a beam spot than the image of the beam waist on sensor 5 is formed on a deviated position 5B of sensor 5 which is deviated from optical axis 0—0 by $\Delta d$. Detection signal having a level which corresponds to deviation $\Delta d$ is supplied from sensor 5 to height signal processor 6. Depth $\Delta h$ of the recess and deviation $\Delta d$ of the beam spot image have a certain geometrical optical relation determined by optical system 100. The detection signal having a level which corresponds to deviation $\Delta d$ is processed by height signal processor 6 to obtain depth $\Delta h$ of the recess. The detection signal processed by height signal processor 6 is stored as a light signal which corresponds to depth $\Delta h$ of the recess in the memory of this processor 6 and the light signal is supplied to differential circuit 9, where the reference level is subtracted from the height signal supplied from height signal processor 6 to generate target signal and this target signal is supplied to switch 10. When switch 10 is closed responsive to the switching signal supplied from the key board, the level of this target signal is supplied to actuator 8A, thereby causing actuator 8A to be energized. Convergent lens 3 is thus moved and the beam spot image is moved to optical axis 0—0 on sensor 5.

When the beam spot image is formed on reference position 5A of sensor 5 on optical axis 0—0, convergent lens 3 focuses on bottom 4B to form a beam waist thereon. The image of the beam waist is formed on reference position 5A of sensor 5 on optical axis 0—0, similarly to the case where the reference surface is traced by the focused laser beam. Therefore, the reference comparison signal is generated by sensor 5 and the target signal of zero level is supplied from differential circuit 9 to actuator 8A through switch 10, thereby keeping actuator 8A deenergized.

Figure 3:
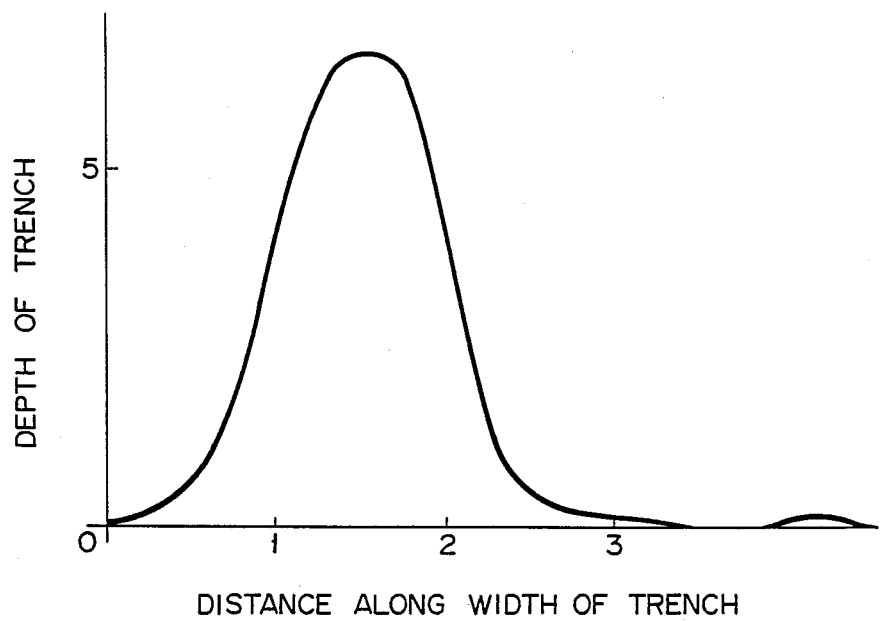
FIG. 3 is a graph showing the relation between and depth of the trench measured by the system of present invention.

The distance of movable mount frame 7b moved until deviation $\Delta d$ becomes zero and actuator 8A is deenergized is detected by position detector 12 such as the electric micrometer or length measuring unit of the laser interference type located adjacent to frame 7B. Length measuring signal supplied from position detector 12 is supplied to height signal processor 6. The length measuring signal and the deviation signal denoting deviation $\Delta d$ and supplied from sensor 5 is processed by height signal processor 6 to obtain a height signal denoting the height of the trench, and this height signal is supplied to the display device and another system. Therefore, the depth or height of the recess measured from the reference surface is displayed on the display device, as shown in FIG. 3. The abovedescribed height signal processor 6 serves only to compute the height of the recess from the reference surface, but it may serve to average height signals, compute peak-to-peak level of the height signals, achieve the edging process using height and position signals, compute the width of patterns, or achieve various kinds of processes relating to roughness.

Figure 4:
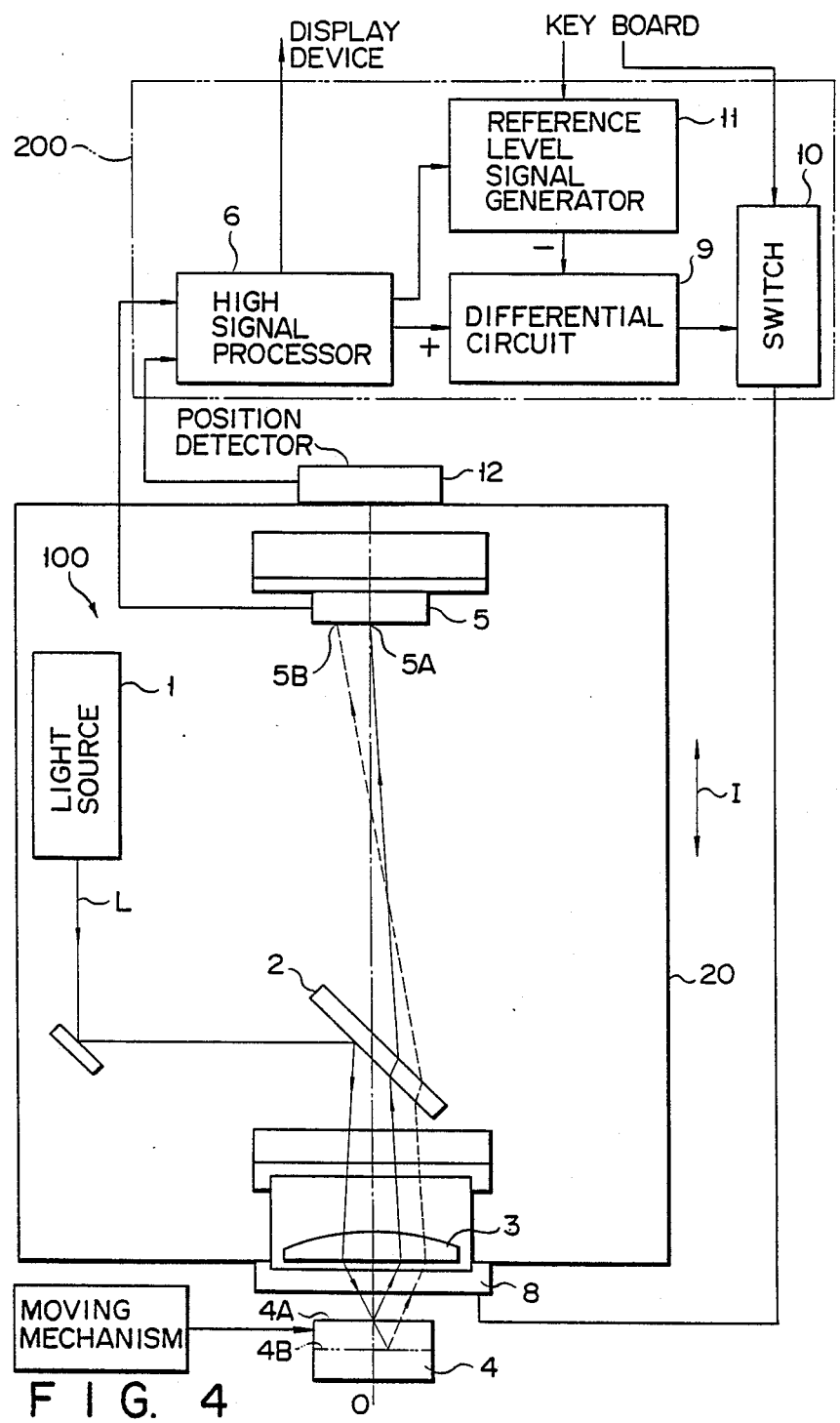
FIG. 4 is a block diagram showing an another embodiment of a system for measuring the surface profile of an object to be measured according to the present invention.

Although the embodiment of the present invention shown in FIG. 1 has used the mount frame 7B movable on the base, base 20 on which light source 1, beam splitter 2 and convergent lens 3 are fixed may be moved in direction shown by arrow I in FIG. 4. Optical system 100 and signal processing system 200 shown in FIG. 4 are different from those shown in FIG. 1 only in that the deviation of base 20 is detected by position detector 12. Therefore, description on this example shown in FIG. 4 will be omitted.

Figure 6:
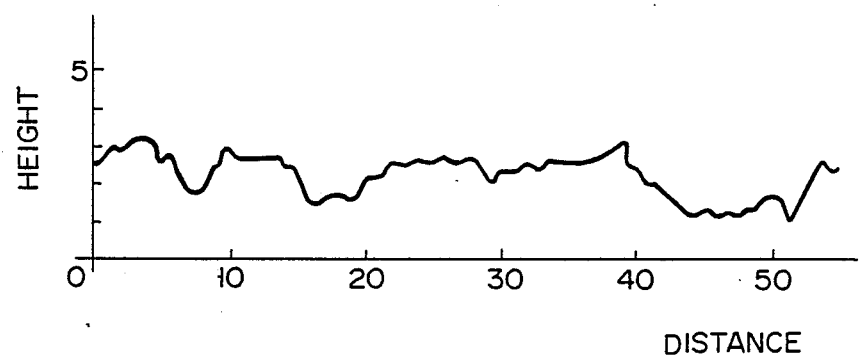
FIG. 6 is a graph showing the state of the surface condition of an object measured by the system of the present invention.
Figure 5:
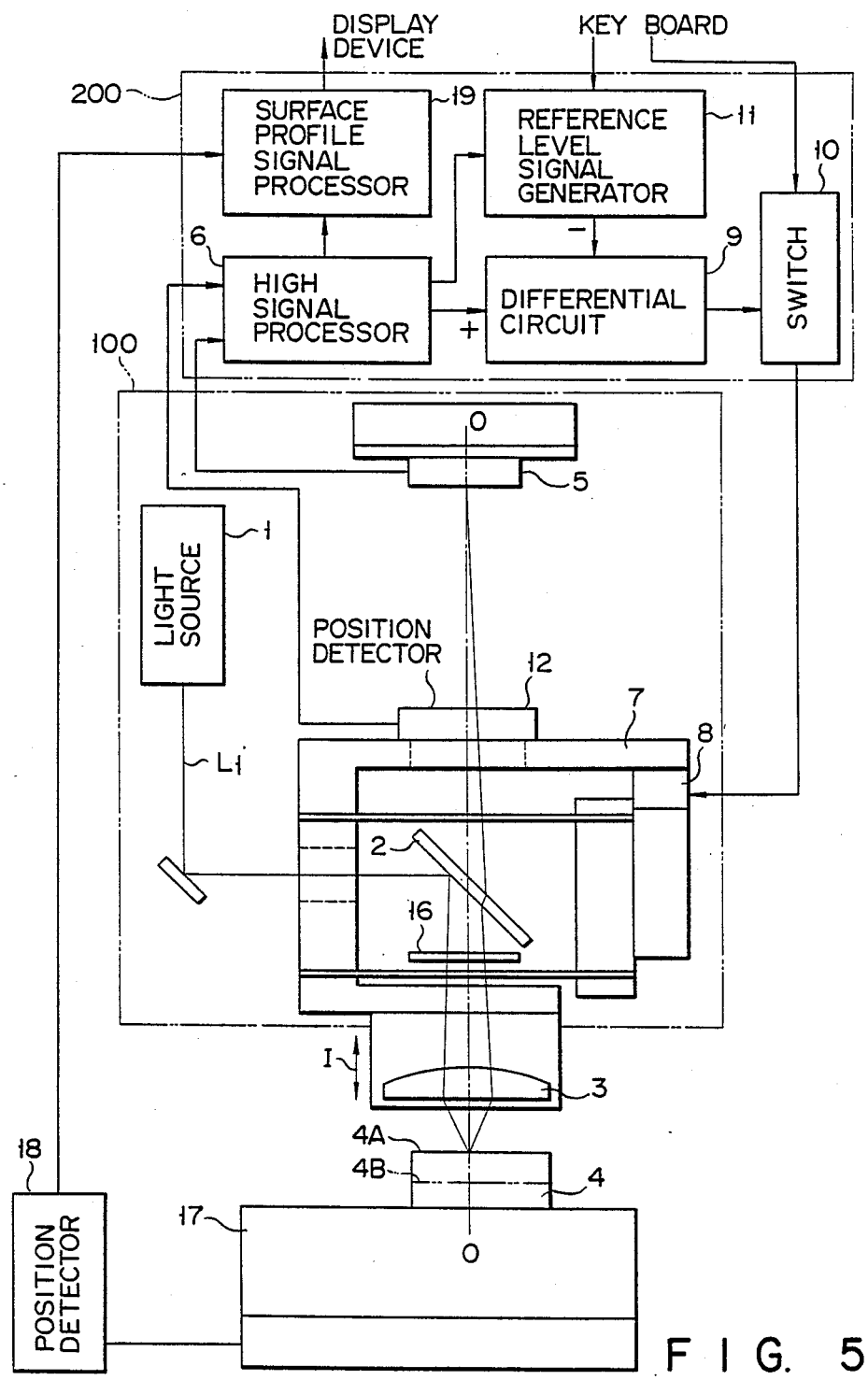
FIG. 5 is a block diagram showing a further embodiment of a system for measuring the surface profile of an object to be measured according to the present invention.

In the case of a further example shown in FIG. 5, object 4 to be measured is mounted on base 17 minutely movable on a plane perpendicular to direction I in which convergent lens 3 is moved, and the amount of movement of this base 17 is detected by position detector 18. Movable base 17 uses the screw mechanism as its roughly moving mechanism and the piezo-element or speed reducing means as its minutely moving mechanism. Position detection signal is supplied, as signal relating to plane coordinates of the object, from position detector 16 to surface profile signal processor 19. Since signal relating to the height of the object is also supplied from height signal processor 6 to this surface profile signal processor 19, the signals relating to the plane coordinates and height of the object are processed by surface profile signal processor 19 and such a computed result as shown in FIG. 6 is displayed on the display device. In the case of the example shown in FIG. 5, polarization beam splitter is used as beam splitter 2. Quarter wave plate 16 is therefore located between polarization beam splitter 2 and convergent lens 3.

According to the system shown in FIG. 5, linearly polarized laser beam generated from a light source such as semiconductor laser 1 is reflected by deflecting beam splitter 2 and introduced to quarter wave plate 16. The linearly polarized laser beam is polarized into an ellipse or circular by quarter wave plate 16 and the ellipse or circular polarized laser beam is converged by convergent lens 3 to enter into object 4. The polarized laser beam reflected from object 4 is returned to quarter wave plate 16 through convergent lens 3 and is converted by quarter wave plate 16 into a linearly polarized laser beam, polarization plane of which is rotated relative to the linearly polarized laser beam generated from light source 1. Therefore, the laser beam emerging through quarter wave plate 16 is passed through beam splitter 2 and directed to sensor 5.

According to the system shown in FIG. 5, the laser beam emitted from the light source can be efficiently transmitted to the sensor without attenuating its intensity, thereby preventing the detecting sensibility of the system from being lowered by the change of its light intensity. Although object 4 has been moved in the system shown in FIG. 5, optical system 100 may be moved on a plane perpendicular to direction I, instead of moving object 4.

Figure 7:
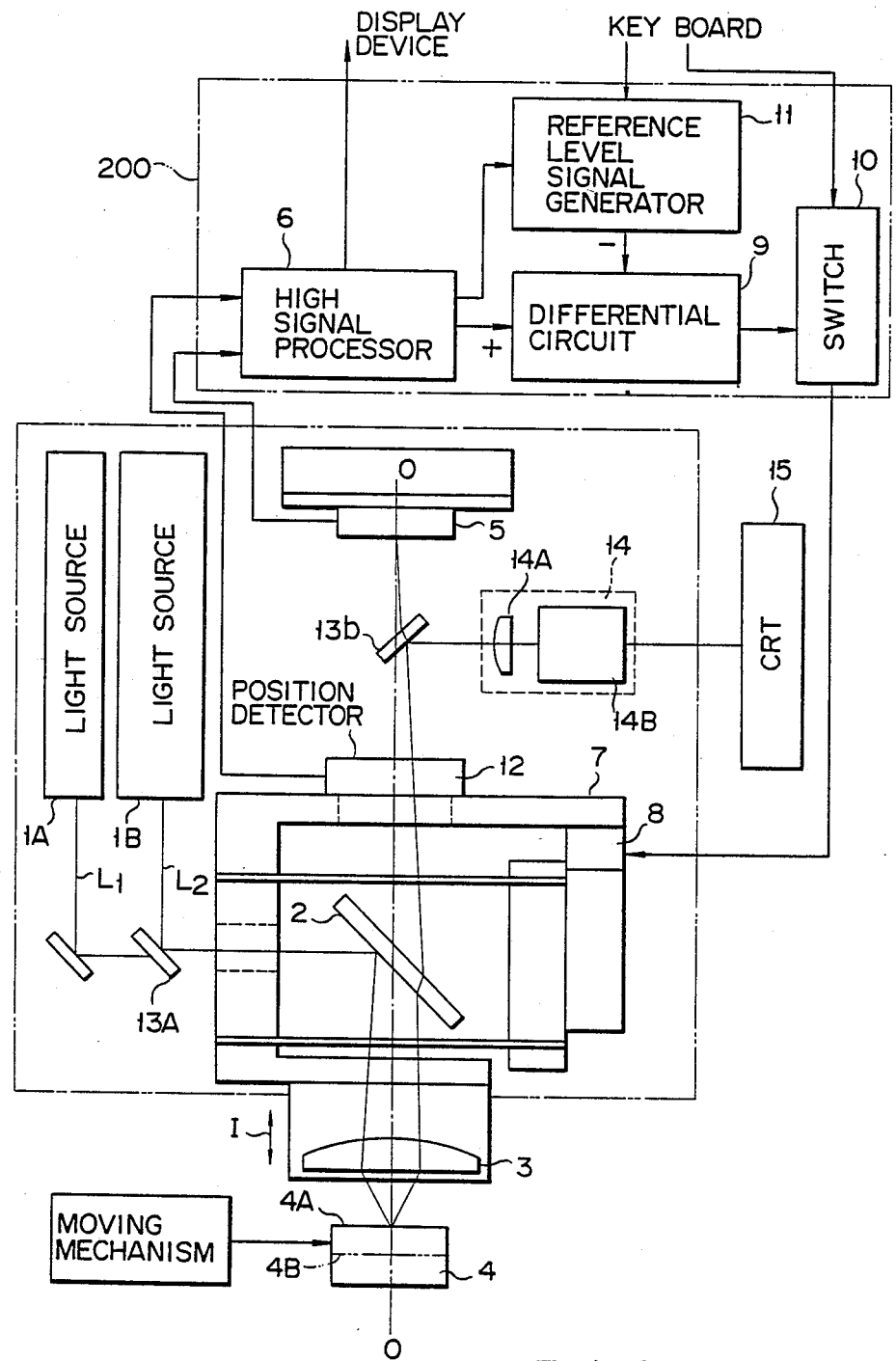
FIG. 7 is a block diagram showing a still further embodiment of a system for measuring a surface profile of an object to be measured according to the present invention.

In the case of a still further embodiment of the system shown in FIG. 7, second light source 1B for generating second light beam L2 to illuminate, observe and detect the surface of object 4 is provided in addition to first light source 1A for generating first laser beam L1 to detect the condition of the surface of object 4. The first laser beam and second light beam generated from first and second light sources 1A and 1B have different wavelengths and the first laser beam is introduced into polarization beam splitter 2, passing through first dychroic mirror 13A while second light beam L2 is reflected by dychroic mirror 13A and introduced to deflecting beam splitter 2. As already described above, first laser beam and second light beams L1 and L2 are introduced to object 4 through convergent lens 3, reflected by object 4, returned to deflecting beam splitter 2 through convergent lens 3 and then introduced to second dychroic mirror 13B, passing through deflecting beam splitter 2. First laser beam L1 is allowed to pass through second dychroic mirror 13B and directed to sensor 5 while second light beam L2 is reflected by second dychroic mirror 13B. First laser beam L1 is detected by sensor 5, as already described above, and converted to the position signal relating to the depth of the recess. On the other hand, second light beam L2 is converted to image signal at image pickup device or tube 14B through TV camera lens 14A. This image signal is supplied to TV monitor or cathode ray tube 15 and the image of the surface of object 4 is thus displayed on TV monitor or cathode ray tube 15.

In the case of the system shown in FIG. 7, the surface of object 4 can be observed by TV monitor or cathode ray tube 15. Further, the beam waist or spot of first laser beam L1 can also be observed. Furthervalues of the recess on the surface of object 4 displayed responsive to outputs of height signal processor 6 can be compared with the condition of the surface thereof observed on TV monitor or cathode ray tube 15. Although dychroic mirrors 13A and 13B have been used as the optical element for multiplexing two laser beam and separating the multiplexed laser beams in the system shown in FIG. 7, optical band pass filters may be used instead of dychroic mirrors 13A and 13B.

According to the system of the present invention having the above-described arrangement to measure the surface profile of an object to be measured, a minute deviation on the surface of the object can be measured at a high speed and with a high accuracy without contacting the object.

What is claimed is:

1. An optical system for measuring a surface profile of an object in relation to a reference surface, comprising:

first light source means for generating a first measuring coherent light beam;

converging means having an optical axis, for converging said first measuring coherent light beam onto a measuring point on a surface of said object, and for relaying a light beam reflected from said surface of said object;

said detector means having a detecting surface on which a reference position is defined, for receiving the reflected first light beam which is reflected from said surface of said object and emerged from said converging means such that a beam spot is formed on said detecting surface, and for generating a position signal according to positions of the beam spot on said detecting surface;

means for directing said first measuring coherent light beam generated from said light beam generating means to said converging means and for directing the reflected light beam emerged from said converging means to said detecting means, said first measuring coherent light beam generated from said light beam generating means being guided so as to diverge from said optical axis of said converging means so that the first light beam emerged from said converging means is incident on said object at a predetermined inclined, non-perpendicular incident angle, said beam spot on said detecting surface being formed in said reference position when said measuring point is positioned in said reference surface and said beam spot on said detecting surface being deviated from said reference position when the measuring point is shifted from said reference surface;

first moving means for supporting said converging means and for moving it along said optical axis;

second detector means for detecting a movement of said converging means which is moved by said first moving means, and for generating a first distance signal according to a movement distance of said converging means;

second moving means for moving said object relative to said converging means in a direction substantially perpendicular to said optical axis;

energizing means for generating an actuating signal responsive to said position signal supplied from said first detector means and in accordance with a deviation of said beam spot on said detecting surface, and for energizing said first moving means to move said converging means so as to move said beam spot to said reference position on said detecting surface of said detector means; and signal processing means for processing said position signal and said first distance signal supplied from said first and second detector means, respectively, for computing the surface profile of said object in relation to said reference surface thereof.

2. The system according to claim 1, further comprising second light source means for generating second light beam to illuminate the surface of the object;

optical multiplexing means for multiplexing said first and second light beams generated from said first and second light source means, and for directing the multiplexed light beams to said converging means;

separating means for optically separating said multiplexed light beams converged from said converging means and reflected from said surface of said object to the first and second light beams, and for directing said first light beam to said first detector means; and means for converting the separated second light beam to a signal and then to images for monitoring said surface of said object.

3. The system according to claim 1, wherein said means for directing said first light beam comprises a polarized beam splitter and a quarter wave plate.

4. The system according to claim 1, wherein said first moving means includes a moving base means for supporting said converging means, and an actuator mechanism for moving said base means along said optical axis.

5. The system according to claim 1, wherein said first light beam converged by said converging means has a beam waist, and when a beam spot which corresponds to said beam waist is formed on said reference surface of said object, said detecting surface of said first detector means and said reference surface of said object are located relative to said converging means such that an image of said object can be formed on said detecting surface, and the image of said beam waist is formed as a beam spot on said detecting surface on said optical axis and said reference position on said detecting surface is defined as a position on said detecting surface on said optical axis.

6. The system according to claim 5, wherein said energizing means includes:

means for holding a reference position signal supplied from said first detector means when the beam spot is formed on said detecting surface at said reference position thereof; and subtracting means for subtracting said reference position signal from a position signal supplied from said first detector means when the beam spot is formed at a position deviated from said reference position of said detector surface, to thereby generate an actuating signal.

7. The system according to claim 6, wherein said energizing means includes means for allowing said actuating signal to be supplied to said first moving means.

8. The system according to claim 1, further comprising third detector means for detecting a movement distance of said object to generate a second distance signal.

9. The system according to claim 8, wherein said signal processing means includes means for processing said position signal and said first and second distance signals, and for computing the surface profile of said object in relation to said reference surface thereof.

* * * * *